United States Patent [19]

Grenoble et al.

[11] 4,419,222

[45] Dec. 6, 1983

[54] HYDROCARBON CONVERSION PROCESSES USING IMPROVED TRANSITION METAL OXIDE CATALYSTS

[75] Inventors: Dane C. Grenoble, Baton Rouge, La.; Chang J. Kim, Somerset; Lawrence L. Murrell, South Plainfield, both of N.J.

[73] Assignee: Exxon Research and Engineering Co., Florham Park, N.J.

[21] Appl. No.: 332,162

[22] Filed: Dec. 18, 1981

Related U.S. Application Data

[63] Continuation-in-part of Ser. No. 203,141, Nov. 3, 1980, abandoned, which is a continuation-in-part of Ser. No. 927,828, Jul. 25, 1978, Pat. No. 4,233,139.

[51] Int. Cl.$^3$ .................. C10G 11/04; C10G 11/16
[52] U.S. Cl. .................. 208/120; 208/110; 208/111; 208/119
[58] Field of Search ............. 208/119, 120, 110, 111

[56] References Cited

U.S. PATENT DOCUMENTS

| | | | |
|---|---|---|---|
| 2,726,234 | 12/1955 | Field et al. | 252/447 |
| 2,817,626 | 12/1957 | Mabry et al. | 208/112 |
| 2,849,383 | 8/1958 | Hirschler et al. | 208/119 |
| 3,108,063 | 10/1963 | Chin et al. | 208/95 |
| 4,233,139 | 11/1980 | Grenoble et al. | 208/119 |
| 4,244,811 | 1/1981 | Grenoble et al. | 208/122 |
| 4,269,737 | 5/1981 | Grenoble et al. | 252/458 X |

OTHER PUBLICATIONS

Shankland and Schmitkons "Determination of Activity and Selectivity of Cracking Catalyst" Proc. API 27 (III) 1947, pp. 57–77.

*Primary Examiner*—Curtis R. Davis
*Assistant Examiner*—George E. Schmitkons
*Attorney, Agent, or Firm*—Edward M. Corcoran

[57] ABSTRACT

Hydrocarbons are cracked by contacting, in a cracking zone and at elevated temperature, a hydrocarbon feed with an acid catalyst comprising at least a catalytic metal oxide component wherein said metal is selected from the group consisting essentially of (a) tungsten, niobium and mixtures thereof and (b) mixtures of (a) with tantalum, hafnium, chromium, titanium, zirconium and mixtures thereof, and wherein said catalytic metal oxide component is supported on a silica-containing inorganic refractory metal oxide support the silica content of which is less than 50 wt. % of the total support, said catalyst being steamed prior to use at a temperature at least 600° C. In a preferred embodiment, the support will comprise a mixture of silica and the γ-alumina wherein the silica content is less than 25 wt. % thereof. Further, one may employ steam in the cracking zone.

17 Claims, No Drawings

HYDROCARBON CONVERSION PROCESSES USING IMPROVED TRANSITION METAL OXIDE CATALYSTS

CROSS REFERENCE TO RELATED APPLICATIONS

This application is a continuation-in-part of Ser. No. 203,141, filed Nov. 3, 1980 (now abandoned), which in turn is a continuation-in-part of Ser. No. 927,828, filed July 25, 1978, now U.S. Pat. No. 4,233,139.

BACKGROUND OF THE INVENTION

1. Field of the Invention

This invention relates to a hydrocarbon conversion process comprising contacting a hydrocarbon feed with a catalyst comprising a transition metal oxide component supported on a silica-containing support, the silica content of which is less than 50 wt.% thereof. More particularly, this invention relates to cracking hydrocarbon feeds by contacting said feed at elevated temperature with a solid acid catalyst comprising a catalytic metal oxide component wherein said metal is selected from the group consisting essentially of (a) tungsten, niobium and mixtures thereof and (b) mixtures of (a) with tantalum, hafnium, chromium, titanium, zirconium and mixtures thereof wherein said metal oxide is supported on a silica-containing inorganic refractory metal oxide support, the silica content of which is less than 50 wt.%.

2. Background of the Disclosure

Cracking of petroleum fractions over acid catalysts represents the most widely used means of molecular weight reduction in refining processes. In a cracking process, in the presence of steam, a potentially effective catalyst in the process is required to have components which retain a high level of acid cracking activity in the presence of steam.

Most of the conventional acid catalysts used in catalytic cracking processes are known to be unsuited for use in the presence of steam at temperatures greater than about 1400° F. (760° C.). The effects of water are considered to be those of a structural poison and result in a weakening of the acid strength of the acid sites. Stability in high steam environments is desirable however, since one way of removing the coke which is inevitably deposited on the catalyst is to steam gasify the coke on the catalyst. The burning off of the coke necessarily requires the presence of steam.

In cracking processes it is generally the object to generate lower molecular weight, but commercially valuable products, from higher molecular weight crude feedstocks. The catalysts used in these acid catalyzed processes, however normally suffer from extreme sensitivity to contaminants in the feedstocks such as sulfur, nitrogen and traces of various metals such as nickel, vanadium, iron, chromium. The catalysts are also susceptible to rapid deactivation by the depositing of coke.

U.S. Pat. No. 3,649,707 teaches a multistep, multicatalyst dealkylation using steam. The first reaction zone utilizes a catalyst composite containing as active ingredients a cobalt component, a nickel component or a Group VIB component, preferably composited with a high surface area refractory inorganic oxide type carrier characterized in having a surface area of at least 50 m²/gm. These carriers include alumina, silica, silica-alumina, zirconia, thoria, magnesia, titania, bauxite, mordenite, faujasite, etc. The cobalt, nickel or Group VIB component can be in the elemental or oxide form. This catalyst is used in a first reaction zone for dealkylating an alkyl aromatic at dealkylation conditions controlled to produce a first reaction zone effluent wherein about 1 to about 20 wt.% preferably about 1 to 10 wt.% of the alkyl-aromatic passed to said zone is dealkylated. Zone one is run at conditions which include a temperature of about 300° C. to about 700° C., a pressure of about atmospheric to about 100 atmospheres, a steam to hydrocarbon mole ratio of about 1:1 to about 30:1 or more and a liquid hourly hydrocarbon space velocity of about 0.1 to about 20 hr$^{-1}$ or more. The reaction practiced in this zone is dealkylation as has been previously stated. Steam dealkylation is a catalyzed reaction wherein water is a consumed reactant. This is to be contrasted with acid cat cracking which is associated with acid sites found on the catalyst and which though preferably practiced in the presence of steam does not consume the steam that is, water is not a reactant.

U.S. Pat. Nos. 4,269,737, 4,233,139 and 4,244,811, the disclosures of which are incorporated herein by reference, disclose solid acid catalysts comprising certain supported transition metal oxides, their preparation and use as acid cracking catalysts. The supports are silica-free refractory metal oxides which are not in themselves acid cracking catalysts, but which when combined with the transition metal oxide component result in acid cracking catalysts. These catalysts are taught as having enhanced activity and selectivity towards forming liquid products compared to conventional acid catalysts. They also exhibit remarkable resistance to coke make and have unusual steam stability. In fact, in some cases it is preferred to pre-steam these catalysts prior to use in order to stabilize the surface thereof. Although steaming these catalysts initially results in a decrease of both surface area and strong acid sites, the steaming itself serves to stabilize the remaining surface area and acidity which is not substantially adversely affected by subsequent steaming. The catalysts described in these patents exhibit primarily Lewis acidity.

U.S. Pat. No. 2,849,383 discloses silica-alumina cracking catalysts which may contain tungsten oxide as a component thereof, which catalysts are steamed at a temperature of from about 600°–800° C. prior to use. However, the disclosures of this patent are very specific in teaching that the silica content of the catalyst support should be at least above about 50% silica calculated as SiO$_2$ and preferably between 50 and 90 wt.% silica, with the balance being alumina.

SUMMARY OF THE INVENTION

The present invention relates to hydrocarbon conversion processes comprising contacting a hydrocarbon feed, at elevated temperature, with an acid cracking catalyst comprising a catalytic metal oxide component wherein said metal is selected from the group consisting essentially of (a) tungsten, niobium and mixtures thereof, and (b) mixtures of (a) with tantalum, hafnium, chromium, titanium, zirconium and mixtures thereof, said catalytic metal oxide component being supported on a silica-containing refractory metal oxide support which contains less than 50 wt.% silica calculated as SiO$_2$, said catalyst being steamed at elevated temperature prior to use. The silica content of the support will preferably be below about 25 wt.% thereof and still more preferably no more than about 15 wt.% silica calculated as $SiO_2$. In a preferred embodiment, the support will comprise a mixture of silica and alumina, preferably a high surface area γ-alumina. In one embodiment of this invention, steam may be present in the conversion zone if desired.

DETAILED DESCRIPTION

As set forth above, catalysts useful in the process of this invention will comprise a catalytic transition metal oxide component on a support which comprises a mixture of silica with at least one other refractory metal oxide wherein the silica content of the support is less than 50 wt.% calculated as $SiO_2$. Suitable examples of other refractory metal oxides as co-components of the support include, but are not limited to, alumina, zirconia, boria, thoria, titania, chromia, kieselguhr and mixtures thereof, as well as compounds of two or more support materials (such as zirconium titanate) alone or mixed with other support materials. In a particularly preferred embodiment, the support will comprise a mixture of silica and alumina, most preferably, a mixture of silica and γ-alumina. In any event, the silica content of the support should be less than 50 wt.% thereof calculated as $SiO_2$, preferably less than 25 wt.% and still more preferably no greater than about 15 wt.% thereof. The support should have a high surface area in the region of from about 20 to 500 $m^2/g$, preferably 40 to 200 $m^2/g$ and most preferably over 100 $m^2/g$. These surface areas are surface areas of the support alone, without any transition metal oxide thereon and are as measured by the Brunauer-Emmett-Teller (BET) method.

The catalysts of this invention may be prepared by techniques well-known in the art, such as incipient wetness, impregnation, etc., the choice being left to the practitioner. When using the impregnation technique, the impregnating solution is contacted with the support material for a time sufficient to deposit the precursor material onto the support either by selective adsorption or alternatively, the excess solvent may be evaporated during drying leaving behind the precursor salt. Advantageously, incipient wetness techniques may also be used. The choice of catalyst preparation method is left to the practitioner. The transition metal oxide salt solution used in preparing the catalyst of this invention may be aqueous or organic, the only requirement being that an adequate amount of precursor compound for the selected transition metal oxide be soluble in the solvent used in preparing this solution.

The catalysts of this invention may also advantageously contain minor amounts of various promoter materials selected from one or more oxides of Group IIA. Particularly preferred are oxides of barium, calcium, strontium and mixtures thereof. These promoter materials, in the form of precursor salts, can be incorporated into the carrier simultaneously with the transition metal oxide precursor salt, or sequentially (the order of addition being merely a matter of choice), or may be coprecipitated with the support material. Alternatively, they may be added subsequent to the formation of the catalyst composite. If used at all these promoters will be present in an amount ranging from about 0.01 to 4.0 wt.% promoter based on the total catalyst composition.

The final catalyst composite will then normally be dried at temperatures ranging from about 50°-300° C. to remove the excess solvent and, if necessary decompose the salt if it is an organic salt. The transition metal oxide precursor is then converted into the oxide form by calcining at temperatures of from about 150° to 800° C. and preferably 300°-700° C. in a suitable oxidizing atmosphere such as air, oxygen, etc. Reducing atmospheres may also be used to decompose the transition metal oxide precursors, but the resulting composite will then require subsequent calcination to convert the reduced metal component to the oxide form. Following the calcination, the composite will then be subjected to high temperature steaming prior to use for period of from about 0.1 to 60 hours, preferably 1-16 hours at temperatures in excess of about 600° C. Suitable steaming temperatures will generally range from about 600°-1200° C. and preferably from about 700°-1200° C. The steam atmosphere will comprise from about 0.1 to 100% steam with a balance being gases that are inert to and which will not adversely affect the catalyst composition such as oxygen, air, nitrogen, noble gases, etc.

The catalysts of this invention will generally have metal oxide loadings of from about 0.5 to 25 wt.% transition metal oxide based on the total catalyst composition, preferably from about 1 to 10 wt.%, more preferably from about 2-8 wt.% and most preferably from about 4-8 wt.% based on the total catalyst composition. When the catalytic metal oxide comprises a mixture of tungsten, niobium and mixtures thereof in combination with one or more oxides of tantalum, chromium, titanium, zirconium, hafnium and mixtures thereof, the ratio of tungsten oxide, niobium oxide or mixture thereof to the additional transition metal oxide or oxides will be at least about 1 to 1, preferably about 3 to 1 and still more preferably about 9 to 1.

Any useful hydrocarbon feedstock may be employed in the process of this invention including both natural and synthetic feeds such as whole or topped crude oils, resids, synthetic fuels derived from the liquefaction of coal, from shale oil, from Cold Lake crude, etc. Illustrative, but non-limiting examples of the process of this invention include gas oil cat cracking, resid cat cracking, heavy ends cat cracking, acid hydrocracking, etc. Further, because the catalysts of this invention are resistant to steam under conditions of high temperature, one may, if desired, have steam present in the cracking or hydroconversion zone.

Typical conditions employed in the hydroconversion or the cracking zone of the process of this invention will include temperatures broadly ranging from about 300°-900° C., preferably 400°-600° C. at pressures ranging from at about 0 to 10,000 psig, preferably 50-500 psig. Contact times of the catalyst with the feed can range from less than 1 second to as much as 2,000 seconds or more, preferably from about 1-120 seconds. Space velocities will generally range from about 0.1 to 50 wt. feed/hr/wt. catalyst (WHW, preferably 1-4 WHW). As stated above, $H_2O$ as steam may be employed in the conversion zone along with the hydrocarbon feed. When steam is employed in the conversion zone, the mole ratio of $H_2O$ to the hydrocarbon feed will generally range from about 0.5:1 to 20:1 and preferably from about 1:1 to 10:1.

The invention will be more readily understood by reference to the examples below:

EXAMPLES

EXAMPLE 1

In this example, alumina-silica cogels were made by taking mixtures of methanol solutions of aluminum isobutoxide and ethylorthosilcate to which distilled water was slowly added under conditions of agitation which precipitated the alumina-silica cogel. The so-formed precipitate was then filtered, washed with additional distilled water, dried in air at 110° C. and calcined in air for 16 hours at 500° C. This resulted in an alumina-silica cogel powder which was used as the catalyst substrate. The substrate powder was impregnated with an aqueous solution of ammonium meta-tungstate using the incipient wetness technique. The resulting catalyst precursor was then dried in vacuum at 120° C. for 16 hours, calcined in flowing air at 500° C. for 16 hours followed by steaming at 870° C. for 16 hours in a tube furnace in an 80/20 helium/oxygen mixture that had been sparged through water. The steamed catalyst was then pilled to a 20/40 mesh size.

Four different alumina-silica cogel supports were prepared containing 5 wt.% silica, 15 wt.% silica, 25 wt.% silica, and 45 wt.% silica calculated as $SiO_2$. To these supports was added a sufficient amount of the ammonium meta-tungstate to result in a finished catalyst containing either 6 or 10 wt.% tungsten oxide on the support, the amount of tungsten oxide being based on a total catalyst composition.

The so-formed catalysts of this invention were then evaluated for gas oil cracking activity in a micro activity test unit (MAT) modified to allow for water addition (steam) along with the feed. The MAT unit is recognized in the industry as a standard diagnostic test unit for cat cracking catalysts (see Ciapetta, F. G. and D. J. Henderson, Oil and Gas J 65 (72), 88, (1967) and Gustofson, W. R., Div. of Pet. Chem, ACS Preprints 14, B46 (1969).

The oil feed was an East Texas Light Gas oil having a boiling range of from 450°–700° F. The operating conditions for the tests were:

$H_2O$ Oil mole ratio=3/1
Temp. (catalyst) 900° F. (482° C.)
Pressure 1 atmosphere
(WHSV) oil 8 $hr^{-1}$ (weight hourly space velocity).

The information obtained from the tests was the overall vol. % conversion and the amount of conversion to 400° F. liquids (naphtha gasoline), coke and hydrogen gas.

The conversion data to coke and hydrogen are compared to a standard catalyst's performance under identical conversion levels. Thus, instead of presenting coke and hydrogen production values as absolute numbers, they are made relative to a conventional silica-alumina catalyst operated under identical conversion conditions. Thus, coke producing factor means the amount of coke produced on the experimental catalyst relative to that produced on a conventional silica-alumina cracking catalyst under identical conditions. Similarly, the hydrogen production factor is the amount of hydrogen produced by the experimental catalyst relative to the standard. Selectivity to 400° F. liquids (gasoline) is the percentage of the total conversion by weight that went to 400° F. liquids.

The results of these experiments are given in Table 1 and demonstrate both the usefullness of the catalysts of this invention as acid cracking catalysts, and the fact that it is preferred to have less than 50 wt.%, preferably less than 25 wt.% thereof and still more preferably no more than about 15 wt.% silica calculated as $SiO_2$ in the support.

The results of these experiments are given in the attached table and demonstrate the usefullness of the process of this invention as well as the fact that it is preferred to have less than 50 wt.% preferably less than 25 wt.% and still more preferably no more than about 50 wt.% silica, calculated as $SiO_2$, in the support.

TABLE 1

| Catalyst | MAT Activity | Coke/Producing Factor | Hydrogen Producing Factor |
|---|---|---|---|
| 10 wt. % $WO_3$ on 45/55 $SiO_2/Al_2O_3$ | 25 | 1.1 | 3.7 |
| 10 wt. % $WO_3$ on 25/75 $SiO_2/Al_2O_3$ | 35 | 1.12 | 4.6 |
| 6 wt. % $WO_3$ on 15/85 $SiO_2/Al_2O_3$ | 42 | 1.3 | 3.6 |
| 6 wt. % $WO_3$ on 5/95 $SiO_2/Al_2O_3$ | 39 | .95 | 1.5 |
| 10 wt. % $WO_3$ on $\gamma$-$Al_2O_3$* | 45 | 1.5 | 6.6 |

*Englehard industries reforming grade $\gamma$-$Al_2O_3$.

EXAMPLE 2

In this example, a number of experiments were conducted using silica-alumina supports wherein the silica was deposited onto the surface of the alumina as opposed to the co-gels of Example 1. These supports were prepared using an incipient wetness technique wherein a methanol solution of tetraethoxysilane was added to a standard, dehydrated, reforming grade of $\gamma$-$Al_2O_3$ (Englehard Industries).

For those supports containing either 2 or 3.4 wt.% silica, after the incipient wetness impregnation of the alumina with the methanol silane solution, the methanol was removed by evacuation over night followed by drying in flowing nitrogen for four hours at 120° C. After this, each sample was further heat treated in flowing nitrogen for one or two hours at 250° C., followed by one or two hours at 500° C. to decompose the silicon alkoxide. Each sample was then calcined in air for 16 hours at 500° C.

The 5 wt.% silica support was prepared in a different manner. After being impregnated with the silane, the methanol was not removed from the impregnated alumina prior to steaming. Instead the impregnated, methanol containing alumina was placed directly into a tube furnace wherein it was steamed for two hours at 120° C., then for two hours at 250° C. followed by increasing the temperature to 500° C. over a period of one hour. The steaming was done by contacting the sample with a flowing 80/20 helium/oxygen mixture that had been sparged through water. After the steaming treatment, the support was calcined in air for sixteen hours at 500° C.

In order to obtain a 9 wt.% silica loading on the alumina support two silane impregnations were required. After the first impregnation the silane was decomposed using a procedure similar to that for the 2 and 3.4 wt.% silica supports. After the the second impregnation, the sample was steamed at 120° C. for four hours, followed by 270° C. for two hours and finally for sixteen hours at 500° C. in a tube furnace in a flowing 80/20 helium/oxygen mixture that had been sparged through water. This steam treatment was done to reduce silane removal from the support during the decomposition. Following this, the 9% silica support was also calcined in air for 16 hours at 500° C.

After calcining the silica-doped alumina supports were impregnated with aqueous solutions of ammonium meta-tungstate using the incipient wetness technique. After impregnation, each sample was dried overnight in air at 120° C. followed by calcining in air for 16 hours at 500° C. In those cases where the catalyst was steamed after calcining, the steaming was accomplished by placing the sample in a quartz tube in a tube furnace and passing over same an 80/20 helium/oxygen mixture that had been sparged in water. As was the case in Example 1, the final catalyst compositions were pilled to a 20/40 mesh size.

These catalysts were evaluated for gas oil cracking activity using the MAT unit, procedure and feed of Example 1. The results of these experiments are given in Table 2 and again demonstrate the usefulness of the catalysts of this invention as acid cracking catalysts and the fact that low silica contents are preferred. The results also demonstrate that in those cases where the catalyst was calcined and then steamed at 870° C. as opposed to merely calcining, the steaming treatment resulted in greater activity.

TABLE 2

CRACKING PERFORMANCE OF $WO_3$ on $SiO_2$ - DOPED $\gamma$-$Al_2O_3$ CATALYSTS IN MAT UNIT

| CATALYSTS | CALCINED/ STEAMED 870° C. | SURFACE AREA $m^2/g$ | MAT ACTIVITY | COKE PRODUCING FACTOR | HYDROGEN PRODUCING FACTOR |
|---|---|---|---|---|---|
| 6% $WO_3$ on 2% $SiO_2/Al_2O_3$ | yes/no | | 30 | .59 | 3.5 |
| 6% $WO_3$ on 2% $SiO_2/Al_2O_3$ | yes/no | | 36 | .70 | 2.9 |
| 10% $WO_3$ on 2% $SiO_2/Al_2O_3$ | yes/no | 117 | 48 | 1.62 | 2.2 |
| 10% $WO_3$ on 3.4% $SiO_2/Al_2O_3$ | yes/no | 138 | 51 | 1.06 | 4.7 |
| 6% $WO_3$ on 5% $SiO_2/Al_2O_3$ | yes/no | | 28 | .45 | 1.6 |
| 6% $WO_3$ on 5% $SiO_2/Al_2O_3$ | yes/no | | 48 | .78 | 5.2 |
| | yes/no | | 48 | .78 | 5.2 |
| 10% $WO_3$ on 9% $SiO_2/Al_2O_3$ | yes/no | | 44 | 1.24 | 3.3(?) |

What is claimed is:

1. A hydrocarbon conversion process comprising contacting a hydrocarbon feed, at elevated temperature and in a conversion zone, with a solid acid catalyst comprising at least one catalytic metal oxide selected from the group consisting of the oxides of (a) tungsten, niobium and mixtures thereof and (b) mixtures of (a) with tantalum, hafnium, chromium, titanium, zirconium and mixtures thereof supported on a silica-containing inorganic refractory metal oxide support, the silica content of which is less than 50 wt.% of the total support, said catalyst being steamed at a temperature at least 600° C. prior to use.

2. The process of claim 1 wherein said catalytic metal oxide component is present on the catalyst in an amount ranging from about 0.5 to 25 wt.% of the total catalyst composition.

3. The process of claim 2 wherein the temperature in said conversion zone ranges from about 300°-900° C.

4. The process of claim 3 wherein said pressure in said conversion zone ranges from about 0 to 10,000 psig.

5. The process of claim 4 wherein said feed contacts said catalyst in said conversion zone from about 1 to 2,000 seconds.

6. The process of claim 5 wherein said support comprises a mixture of silica and alumina.

7. The process of claim 6 wherein the silica content of said support is less than 25 wt.% thereof.

8. The process of claim 7 wherein said alumina comprises a gamma alumina.

9. The process of either of claims 7 or 8 wherein said catalyst is promoted with from 0.01 to 4 wt.% of an oxide of metal selected from the group consisting essentially of one or more oxides of barium, calcium, strontium, magnesium, and mixtures thereof based on the total catalyst weight.

10. The process of claim 9 wherein said catalytic metal oxide component is present on said catalyst in amount of from about 1 to 10 wt% of the total catalyst.

11. The process of claim 10 wherein said catalytic metal oxide component is selected from the group consisting of oxides of tungsten, niobium and mixtures thereof in combination with one or more oxides of tantalum, chromium, titanium, zirconium, hafnium and mixtures thereof.

12. The process of claim 11 wherein the silica content of said support is less than about 15 wt.% thereof.

13. The process of claim 12 wherein the ratio of said oxides of tungsten, niobium and mixtures thereof to the other catalytic metal oxides is at least about one to one.

14. The process of claim 13 wherein steam is present in the conversion zone.

15. A hydrocarbon conversion process comprising contacting a hydrocarbon feed, at elevated temperature and in a conversion zone, with a solid acid catalyst comprising at least one catalytic metal oxide supported on a silica-containing inorganic refractory oxide support, said support having a surface area of at least about 20 $m^2/g$ and a silica content, calculated as $SiO_2$, of less than 50 wt.%, wherein said catalytic metal oxide is selected from the group consisting of oxides of (a) tungsten, niobium and mixtures thereof and (b) mixtures of (a) with tantalum, hafnium, chromium, titanium, zirconium and mixtures thereof, said catalyst being steamed at a temperature above about 600° C. prior to use.

16. The process of claim 15 wherein said support comprises a mixture of silica and alumina.

17. The process of claim 16 wherein steam is present in said conversion zone.

* * * * *